June 25, 1935.    R. F. PEO    2,005,750

HYDRAULIC SHOCK ABSORBER

Filed April 29, 1933    2 Sheets-Sheet 1

Inventor
RALPH F. PEO.
by Charles Hiills Attys.

June 25, 1935.  R. F. PEO  2,005,750
HYDRAULIC SHOCK ABSORBER
Filed April 29, 1933   2 Sheets-Sheet 2
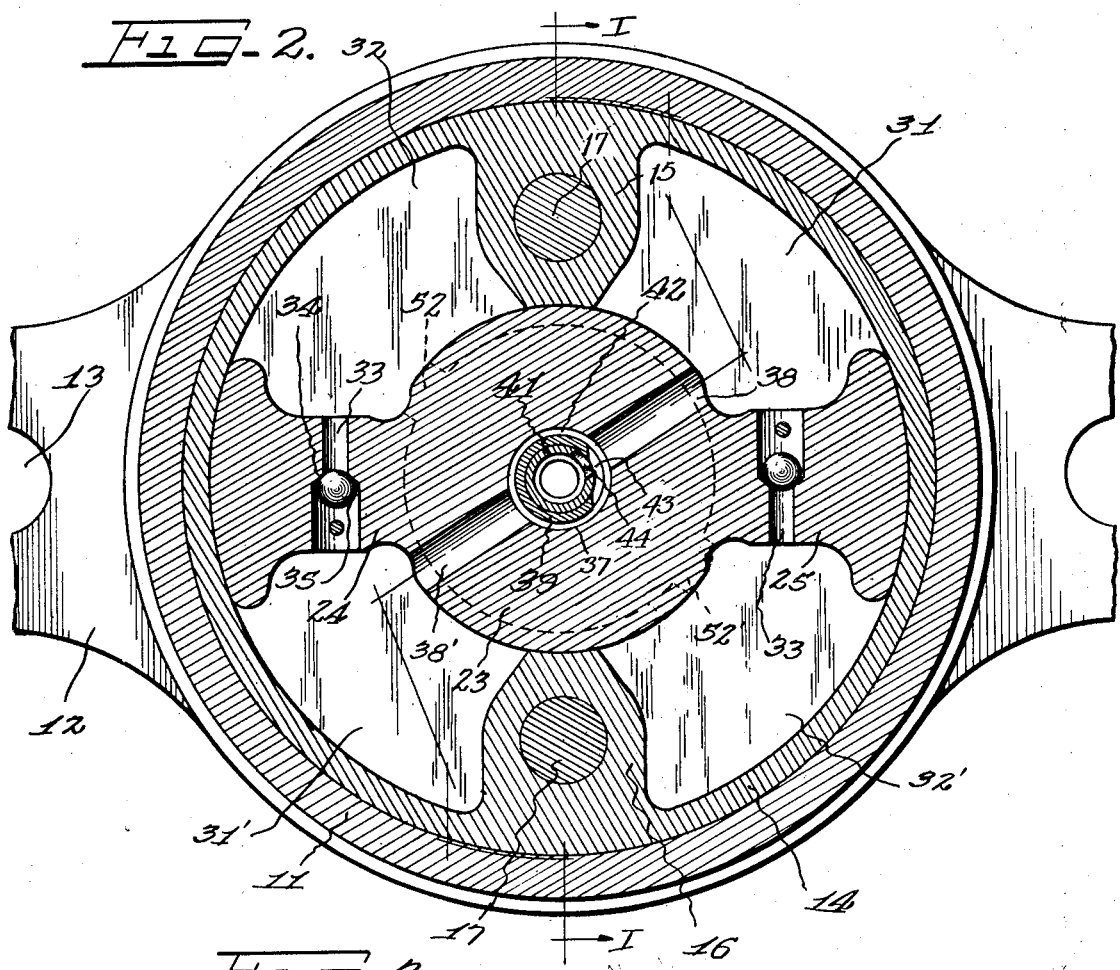
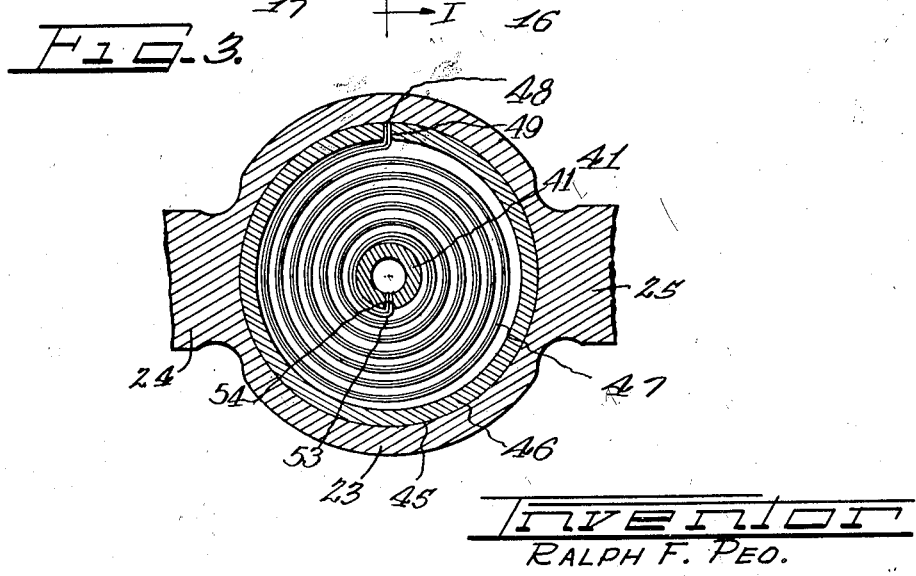
Inventor
RALPH F. PEO.
by Charles W. Hill Attys.

Patented June 25, 1935

2,005,750

UNITED STATES PATENT OFFICE 2,005,750

HYDRAULIC SHOCK ABSORBER

Ralph F. Peo, Buffalo, N. Y., assignor to Houde Engineering Corporation, Buffalo, N. Y., a corporation of New York Application April 29, 1933, Serial No. 668,532

13 Claims. (Cl. 188—89)

This invention relates to hydraulic shock absorbers and particularly to improved valve structures therefor for controlling the bypassage of resistance fluid from one side of the piston structure to the other during operation of the shock absorber for determining shock absorbing resistance.

An important object of the invention is to provide simpler, more economically manufactured and assembled, and more efficient valve structure which may be readily adjusted and set manually from the exterior of the shock absorber and which is then thermostatically adjusted for control of the bypassage resistance to fluid flow in accordance with variations in temperature and resulting change in the viscosity of the fluid.

A further object is to provide valve structure comprising two valve members having ports cooperable for control of the bypassage flow, with one of said members manually adjustable from the exterior of the shock absorber, and the other member thermostatically adjusted.

Another object is to provide a valve structure which may be readily assembled within the piston structure of the shock absorber and in which the thermostat element for adjusting one of the valve members is housed to be accurately guided for control of the valve member and to be protected against fluid pressure, stresses and strain so that it may freely function to accurately control the valving adjustment in accordance with change in temperature of the fluid.

Still a further object is to provide a housing or container for the thermostat element, into which such element and the valve member to be controlled thereby may be accurately assembled before the housing is applied in the shock absorber for association of the thermostatically controlled valve member with the manually adjustable valve member.

The above enumerated and other features of the invention are shown incorporated in the structure disclosed on the drawings, in which drawings Figure 1 is a vertical section through the axis of the shock absorber on plane I—I of Figure 2;

Figure 2 is a section on plane II—II of Figure 1;

Figure 3 is a section on plane III—III of Figure 1;

Figures 1, 4:
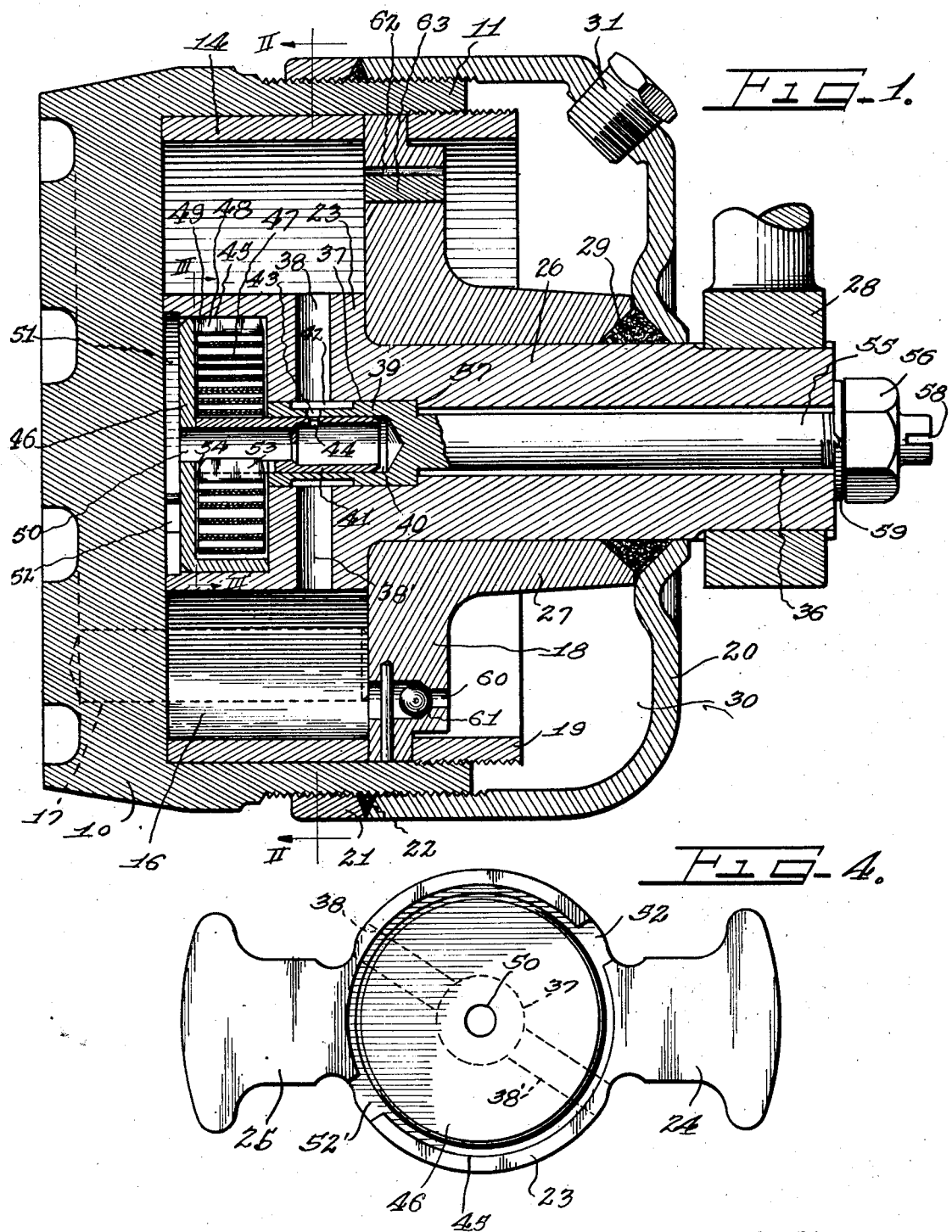
Figure 4 is an inner end view of the piston structure.

The structure shown comprises a base 10 having the cylindrical flange or wall 11 extending therefrom and having laterally extending wings 12 with bolt holes 13 for securing the base structure to a support such as the chassis of an automotive vehicle. Fitting within the cylindrical wall 11 and abutting the base end is a cylindrical ring 14 having the upper and lower partition walls or lugs 15 and 16 extending radially therefrom and preferably integral with the ring 14, this structure being rigidly secured to the base 10 against rotation by means of pins 17 anchored in the base and extending through the walls 15 and 16. A wall 18 fits into the outer end of the cylindrical wall 11 and is held in abutting engagement with the outer faces of the ring 14 and partition walls and this wall 18 is secured by a circular nut 19 threading into the wall 11. A cap structure 20 has threaded engagement with the outer side of the wall 11 and is locked by a locking ring 21 between which and the cap packing material 22 is inserted to prevent leakage.

The piston structure comprises the cylindrical hub 23 having piston wings or vanes 24 and 25 extending radially therefrom in opposite directions, and a driving shaft 26 extending axially from the hub. The hub and the wings extend axially between the base 10 and the wall 18 and the outer surfaces of the wings engage with the inner cylindrical surface of the ring 14. The shaft has bearing in the wall 18 and the extension 27 thereon, the shaft extending through the outer wall of the cap 20 and is adapted to receive the arm or lever 28 whose end is connected usually with the axle of the automotive vehicle. Packing material 29 is inserted between the cap 20 and the end of the bearing extension 27 to prevent leakage, the base enclosed by the cap and the wall 18 and bearing extension 27 forming a reservoir or replenishing chamber 30 into which the resistance fluid may be charged through an opening adapted to be closed by a plug 31.

The partition and walls 15 and 16 are engaged at their inner ends by the cylindrical surface of the piston structure hub and the partitions and the piston structure divide the space within the ring 14 into high pressure chambers 31, 31' and low pressure chambers 32, 32'. Each of the piston vanes has a bypassage 33 therethrough providing a seat 34 for a valve 35 such as a ball, the valves being arranged so that the resistance fluid may flow from the low pressure chambers into the high pressure chambers during low pressure movement of the piston structure, as when the vehicle chassis and axle move toward each other, but so that the valves will close these bypasses against flow from the high pressure to the low pressure chambers during the high pressure or rebound movement of the vehicle, as when the chassis and axle are separated by the spring recoil.

A separate more restricted pass is provided for flow of fluid from the high pressure to the low pressure chambers and this pass is also available for flow from the low pressure to the high pressure chambers in addition to the flow through the bypassage ways 33. Provision is made to control the high pressure flow in accordance with change in temperature and resulting change in the viscosity of the fluid so that the shock absorber resistance will remain uninfluenced by such viscosity change. This automatic control is by means of valve mechanism which will now be described. The shaft 26 has the axial bore 36 therethrough which at its inner end is slightly enlarged in diameter to provide the cylindrical valve chamber 37 which is connected by the ducts 38 and 38' with the high pressure chambers 31 and 31', these ducts extending radially through the piston hub 23. Within the valve chamber 37 is the outer member or frame 39 which is cylindrical and has the cylindrical bore 40 for receiving and seating the inner valve member 41. The outer valve member 39 has the circumferentially extending channel 42 in its outer side forming a connection between the inner ends of the ducts 38 and 38' and the member 39 has the port 43 therethrough communicating with the channel, the port shown being a circumferentially extending slot. The inner valve member 41 has a port 44, shown as a circumferentially extending slot for cooperating with the port 43 to control the fluid flow. The inner valve member 41 is shown to be of tubular construction forming a passage communicating with the port 44 and included in the bypass circuit.

In the inner end of the piston structure hub 23 is the cylindrical pocket 45 which is concentric with the valve chamber 37. This pocket serves to receive and house the thermostat structure for controlling the valves. The structure comprises a cylindrical cup 46 which may readily be formed of sheet metal, the cup being of such outer diameter as to frictionally fit into the pocket 45. Within the cup is the spiral thermostat coil 47 formed from a strip of bi-metal whose metal layers are of material of different expansion coefficient. The outer end 48 of the coil is anchored to the cup, the end being deflected to extend radially into a slot 49 formed in the cylindrical wall of the cup. The cup is inserted in the pocket 45 with its bottom side out so as to form a closure for the pocket. The cup receives the outer end of the tubular inner valve member 41 and in its bottom has the opening 50 registering with the bore of the valve member. The depth or axial width of the cup is less than the depth of the pocket 45 so that after insertion of the cup in the pocket there will remain a shallow space or chamber 51 between the cup bottom and the base 18 which space or chamber is connected by ports 52 and 52' with the low pressure chambers 32 and 32' respectively, the bypassage from the high pressure chambers to the low pressure chambers thus including the ducts 38 and 38', the channel 42, the valve ports 43 and 44, the bore of valve 41, the opening 50 through the cup bottom, the chamber 51, and the ports 52 and 52'.

The inner end 53 of the thermostat coil is deflected radially and is received in the longitudinal slot 54 in the inner valve member 41 so that during winding and unwinding movement of the coil in response to temperature change the inner valve member will be rotated for adjustment of its port 44 relative to the port 43 in the outer valve member.

The outer valve member 39 has a stem 55 extending axially therefrom and through the bore 36 in the piston shaft, the outer end of the stem being threaded for the reception of a nut 56, the outer end of the valve member seating against the annular shoulder 57. By loosening the nut 56 the stem 55 may be turned for rotary movement of the outer valve member 39 and setting of its port 43 relative to the inner valve port 44. The outer end of the stem may be provided with a screw driver slot 58 for facilitating turning thereof and a spring washer 59 is preferably inserted between the nut and the shaft so that after adjustment of the outer valve member and tightening of the nut the adjustment will remain fixed.

After assembly of the shock absorber, manual adjustment is made of the outer valve member 39 for setting of the valve ports for fluid flow for shock absorber resistance under normal temperature. This setting will be maintained if the temperature does not change. If the shock absorber and the fluid should become heated and the fluid become less viscous, the thermostat coil will respond to the increased temperature and will automatically rotate the inner valve member for less overlap of its port 44 with the port 43 of the outer valve member so that the flow or shock absorber resistance will remain the same as that under normal temperature conditions. If the temperature should become reduced below normal and the fluid become more viscous, the thermostat coil will respond to adjust the inner valve member for greater port overlap to allow for increasing viscosity and to maintain the shock absorber resistance practically normal.

During the rebound stroke of the shock absorber, that is, when the vehicle springs tend to rapidly recoil to move the vehicle body away from the axles, the piston structure will rotate in counterclockwise direction (Fig. 2) during which rotation the bypassages 33 will be held closed by the ball valves so that the only escape of fluid from the high pressure chambers to the low pressure chambers will be through the restricted passage provided by the overlapping ports 43 and 44, the flow being from the high pressure chambers 31, 31' through the ducts 38, 38' to the channel 42 and then through the valve ports and the inner valve member to the chamber 51 and from there through the ports 52 and 52' to the low pressure chambers.

During the so-called bump stroke of the piston, when the axle and vehicle body come together, the piston structure will rotate in clockwise direction (Fig. 2), and the greater part of the fluid flow from the low pressure chambers to the high pressure chambers will be through the bi-passages 33, the remaining flow being through the passage controlled by the valve ports 43 and 44.

The pressure or working chambers of the shock absorber are kept filled with fluid from the reservoir 38, replenishing fluid being drawn into the bottom of each of the lower chambers through a passage 60 in the wall 18 and past a ball valve 61, flow in reverse direction being prevented by the valve. Any collected gases or air may escape from the tops of the upper chambers by way of restricted slits or grooves 62 provided in plugs 63 extending through the wall 18.

By providing in the piston structure hub a cylindrical pocket of comparatively large diameter, a large spiral thermostat coil having many turns will be accommodated which will be very sensitive to temperature changes and powerful to accurately adjust the bypassage resistance in accordance with temperature and resulting viscosity changes. Furthermore, the thermostat coil will have a comparatively large range of angular adjustment of the inner valve member. The container cup for the coil will protect the coil against injury before assembly in the piston pocket and after assembly the coil will be entirely housed and protected against injury and tampering and the cup and adjacent wall of the piston hub will accurately guide the winding and unwinding movement of the coil so that the turning resistance of the valve will be reduced to a minimum.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a hydraulic shock absorber comprising a housing having a space for containing resistance fluid, a piston structure operable within said space against the resistance flow of the fluid, a bypass from one side of the piston structure to the other, a valve seat frame having a port interposed in said bypass, a valve movable on said valve seat frame and having a port for cooperating with said frame port to control the flow of fluid through the bypass, means for manually adjusting said seat frame for setting of its port relative to the valve port, and a thermostat connected with the valve to automatically set its port relative to the frame port in accordance with the changes in temperature of the fluid.

2. In a hydraulic shock absorber, a housing having a space for containing resistance fluid, a piston structure operable within said space against the resistance flow of said fluid, a bypass from one side of the piston structure to the other, a valve chamber interposed in said bypass, outer and inner valve members in said chamber having ports for cooperating to control the flow through said bypass, means for manually adjusting one of said valve members from the exterior of the shock absorber for setting of said ports, and a bi-metal thermostat structure for adjusting the other valve member for automatic setting of said ports for control of the by-passage flow in accordance with the change in temperature of the fluid.

3. In a hydraulic shock absorber, a housing having a space for containing resistance fluid, a piston structure operable within said space against the resistance flow of said fluid, a bypass from one side of the piston structure to the other, and a valve assembly for controlling said bypass, said valve assembly comprising a ported outer valve member and a ported inner valve member, means whereby said outer valve element is manually adjustable for setting of the valve ports, and a thermostat element for automatically adjusting the inner valve element for setting of said ports in accordance with variations in temperature of the fluid.

4. In a hydraulic shock absorber comprising a housing having a space for containing resistance fluid, a piston structure operable within said space against the resistance flow of said fluid, and a bypass from one side of the piston structure to the other, a valve assembly for controlling said bypass and comprising concentric valve members having ports interposed in the bypassage, means for manually moving one of said valve members for relative setting of said ports, and a thermostat element for automatically moving the other valve member for relative adjustment of said ports in accordance with temperature change of the fluid.

5. In a hydraulic resistance device comprising a housing for containing resistance fluid and provided with a piston structure operable against the resistance flow of the fluid and a bypass from one side of the piston structure to the other, a valve chamber intersecting said bypass, a valve assembly comprising outer and inner concentric valve members having ports cooperable to control the bypassage flow, means for manually moving one of said valve members for relative setting of said ports, and thermostat means for automatically moving the other valve member for relative setting of said ports in accordance with changes in temperature of the fluid.

6. In a hydraulic shock absorber comprising a housing forming a chamber for containing resistance fluid, a piston operable within said housing against the resistance flow of the fluid, a fluid bypass through said piston, said piston having an axial bore intersecting said bypass, a rotary valve seated in said bore and having a port, said bore being enlarged at one end to form a cylindrical pocket, and a spiral thermostat element in said pocket connected to rotate said valve for setting of its port in said bypass in accordance with change in temperature of the fluid.

7. A hydraulic shock absorber comprising a housing forming a chamber for containing resistance fluid, a piston hub in said chamber and a vane extending therefrom, an operating shaft extending from the piston hub to the exterior of the housing, said shaft and hub having an axial bore therethrough, a bypass through the hub, a cylindrical outer valve member within said bore having a port communicating with said bypass, an inner valve member seated in said outer valve member and having a port for cooperating with the port of the outer member to control the flow through the bypass, a stem extending from said outer valve member and being manually operable for rotation of said outer valve member for relative setting of said ports, the inner end of said bore being enlarged to form a pocket, and a thermostat coil in said pocket connected to rotate said inner valve member for setting of said ports in accordance with change in the temperature of the fluid.

8. A hydraulic shock absorber comprising a housing forming a chamber for containing resistance fluid, a piston hub in said chamber and a vane extending therefrom, an operating shaft extending from the piston hub to the exterior of the housing, said shaft and hub having an axial bore therethrough, a bypass through the hub, a cylindrical outer valve member within said bore having a port communicating with said bypass, an inner valve member seated in said outer valve member and having a port for cooperating with the port of the outer member to control the flow through the bypassage, a stem extending from said outer valve member through said bore and being manually operable for rotation of said outer valve member for relative setting of said ports, the inner end of said bore being enlarged to form a pocket, a cup in said pocket receiving the outer end of said inner valve member, and a thermostat coil in said cup anchored at one end to said cup and connected at its other end with said inner valve member for rotating said inner valve member for setting of said ports for adjusting the bypass flow in accordance with change in temperature of the fluid.

9. A hydraulic shock absorber comprising a housing forming a chamber for containing resistance fluid, a piston structure operable within said housing against the resistance flow of said fluid, a fluid bypass through said piston structure, a valve extending axially in said piston structure and having a port for controlling said bypass, said piston structure having a cylindrical pocket concentric with said valve, a cylindrical cup seated in said pocket with its bottom forming a closure therefor, and a thermostat coil in said cup connected with said valve for automatic adjustment thereof in accordance with change in temperature of the fluid.

10. In a hydraulic shock absorber, a housing, a piston structure operable within said housing, said housing and piston structure defining working chambers at opposite sides of the piston structure for hydraulic fluid, a passageway connecting said working chambers, a recess in said passageway, valve members in said recess having ports co-operable to control the flow through said passage, means for manually setting one of said valve members, and thermostatic means in said recess for automatically adjusting said other valve member.

11. In a hydraulic shock absorber, a housing, a piston structure operable within said housing, said housing and piston structure defining working chambers at opposite sides of the piston structure for hydraulic fluid, a passageway connecting said working chambers, a pair of relatively rotatable valve members having ports arranged for variable overlap to control the flow of fluid through said passage, one of said valve members being manually adjustable from the exterior of the shock absorber, and a thermostat element within the shock absorber for adjusting the other valve member.

12. In a hydraulic shock absorber, a housing, a piston structure operable within said housing to displace hydraulic fluid therein, said housing and piston structure defining working chambers at opposite sides of the piston structure, a passageway connecting said chambers, a valve and a valve seat therefor in said passage, means operable from the exterior of the housing for adjusting said valve seat relative to said valve, and a thermostat coil within said housing for automatically adjusting said valve relative to said seat.

13. In a hydraulic shock absorber, a housing, a piston structure operable in said housing to displace hydraulic fluid therein, said housing and piston structure defining working chambers at opposite sides of the piston structure, a passageway connecting said chambers, two telescopically engaged valve members interposed in said passage and having ports arranged for variable overlap to control the flow through said passage, means whereby one of said valve members may be manually shifted from the exterior of the shock absorber for setting of said ports, and a thermostat confined within said housing for shifting the other valve member for automatic adjustment of said ports in correspondence with change in temperature of the fluid.

RALPH F. PEO.